United States Patent
Aoki (10) Patent No.: US 7,194,484 B2
(45) Date of Patent: Mar. 20, 2007

(54) CORRECTION OF ADDRESS INFORMATION

(75) Inventor: Norihiro Edwin Aoki, Sunnyvale, CA (US)

(73) Assignee: America Online, Inc., Dulles, VA (US)

( * ) Notice: Subject to any disclaimer, the term of this patent is extended or adjusted under 35 U.S.C. 154(b) by 500 days.

(21) Appl. No.: 10/715,964

(22) Filed: Nov. 17, 2003

(65) Prior Publication Data

US 2005/0108208 A1 May 19, 2005

(51) Int. Cl.
- G06F 17/30 (2006.01)
- G06F 17/00 (2006.01)
- G06F 15/16 (2006.01)
- G06Q 30/00 (2006.01)
- G06F 7/00 (2006.01)
- G06F 12/00 (2006.01)

(52) U.S. Cl. .............. 707/104.1; 709/203; 709/206; 709/207; 705/26; 713/250

(58) Field of Classification Search .............. 707/3, 707/10, 200; 709/203, 206, 207; 713/250; 705/26

See application file for complete search history.

(56) References Cited

U.S. PATENT DOCUMENTS

| | | | | |
|---|---|---|---|---|
| 5,742,668 | A * | 4/1998 | Pepe et al. | 455/415 |
| 6,405,243 | B1 | 6/2002 | Nielsen | |
| 6,438,583 | B1* | 8/2002 | McDowell et al. | 709/206 |
| 6,457,012 | B1* | 9/2002 | Jatkowski | 707/101 |
| 6,564,264 | B1* | 5/2003 | Creswell et al. | 709/245 |
| 6,654,779 | B1* | 11/2003 | Tsuei | 718/101 |
| 2002/0023138 | A1* | 2/2002 | Quine et al. | 709/206 |
| 2002/0080413 | A1 | 6/2002 | Sommerer | |
| 2002/0143879 | A1* | 10/2002 | Sommerer | 709/206 |
| 2002/0178074 | A1* | 11/2002 | Bloom | 705/26 |
| 2003/0120733 | A1* | 6/2003 | Forman | 709/206 |
| 2003/0131005 | A1* | 7/2003 | Berry | 707/10 |
| 2004/0267625 | A1* | 12/2004 | Feng et al. | 705/26 |

FOREIGN PATENT DOCUMENTS

| | | |
|---|---|---|
| EP | 1170910 | 1/2002 |
| JP | 2001177540 | 6/2001 |
| WO | WO 200159595 | 8/2001 |
| WO | WO 200227540 | 4/2002 |

OTHER PUBLICATIONS http://www.telezapper.com/default.asp
http://www.telezapper.com/tour.htm

* cited by examiner

Primary Examiner—Anthony Knight
Assistant Examiner—Sunray Chang
(74) Attorney, Agent, or Firm—Michael A. Glenn; Glenn Patent Group (57) ABSTRACT

The invention provides a process for updating electronic information in a computer environment. A preferred embodiment of the invention automatically inspects a message that is to be delivered to a first address upon receiving the message to determine whether the message contains information about a status of a second address. In response to a determination that the message contains information about the status of the second address, a record for the second address in a database is updated. The record is a portion of an address book of the first user in the database. The message is stored at the first address for retrieval by a first user at the first address. When the status indicates a permanent error in delivering a message to the second address, the address book is updated according to a user preference.

60 Claims, 8 Drawing Sheets

CORRECTION OF ADDRESS INFORMATION

BACKGROUND OF THE INVENTION

1. Technical Field

The invention relates to the correction of electronic data in a computer environment. More particularly, the invention relates to the correction of address information for the delivery of electronic content in a computer environment.

2. Description of Prior Art

Electronic mail messages, e.g. emails, have been used for communication between users across computer networks, such as the Internet. Typically, a sender composes an email message using a mail client program, such as Outlook Express or Eudora. Some mail client programs provide facilities, such as addresses books, for the management of addresses, including email addresses.

The sender's mail client program typically needs a recipient's email address, e.g. bob@aol.com, that specifies the recipient's username, e.g. bob, and the domain name, e.g. aol.com, of the destination of the composed message. The recipient's email address can be input into the sender's mail client program manually by the sender or established automatically by the sender's mail client program when replying to a prior email received from the recipient. A mail client program may be integrated with an address book, where a sender may include the recipient's nickname and one or more email addresses, such as a work address and one or more private addresses. When a sender is composing an email message, the mail client program may retrieve the recipient's email address from the address book.

Some Internet Service Providers (ISPs), such as America Online (AOL), provide centralized address book services in the form of host-based address books. Host-based address books are stored on the server of an ISP. The user has access to the same address book regardless of the location of the computer on which the user operates. Thus, through network connections, a user can always access the same contact information in the host-based address book, thereby avoiding the need to move the address book between different computers.

After the sender instructs the mail client program to send an email message, the mail client program starts to transmit the email message to a computer according to the recipient's email address, typically through one or more relay servers. After it reaches the destination computer, the email message is typically stored on a storage device on the destination computer in an account associated with the recipient's user name. The recipient may retrieve and review the email message from the destination computer via the recipient's mail client program running on a computer remotely from the destination computer or on the destination computer. For example, the email message can be viewed through a network via a web browser when the email messages are maintained on server computers, such as servers of Yahoo! or Hotmail websites.

Sometimes, however, the message delivery to a recipient's email address may fail. For example, an email address may become invalid permanently or temporarily. An email address may fail permanently because the account for the user of the address is closed or the domain of the email address is changed. An email address may fail temporarily because the usage in the email box exceeds a quota designated for the user. When the delivery to the recipient's email address fails, the message is said to "bounce," and an error message indicating the nature of the delivery failure is often generated by the destination computer and sent back to the user.

Figure 1A:
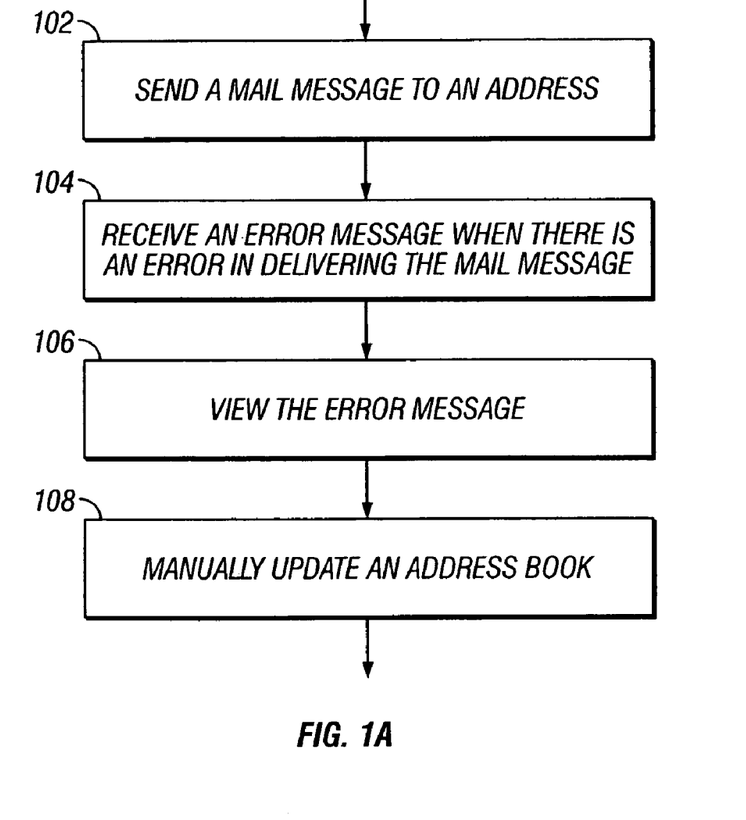
FIG. 1A is a block schematic diagram of a system for updating an address book according to prior art.

FIG. 1A is a block schematic diagram of a system for updating an address book according to prior art. Referring to FIG. 1, after a user sends an email message to an address (102), an error message may be received when an error occurs in delivering the email message (104). After viewing the error message (106), the user may take actions manually to update the address book (108). For example, the user may remove the address or investigate for a replacement address.

Some mailing tools have been used to send a same email message to a large list of recipients based on a mailing list, for example, a list of email addresses. Some mailing tools provide facilities for removing addresses of bounced mail messages from the mailing list automatically when operating in a client mode to receive the emails to the return address. However, the mailing tools allow only deletions of addresses of bounced mail messages. In addition, the bounced messages typically go to the list owner or the manager, not the sender oneself.

Figure 1B:
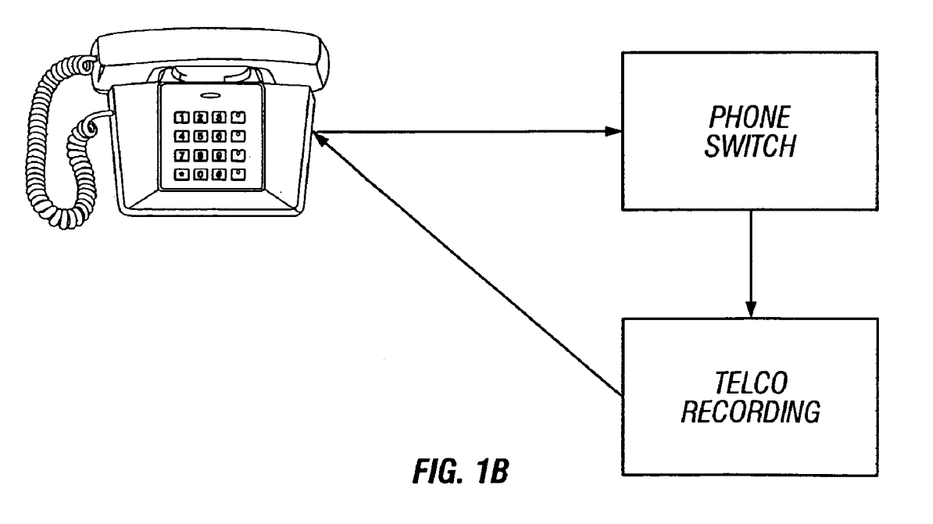
FIG. 1B is a block schematic diagram of a system for updating a telephone number according to prior art.

FIG. 1B is a block schematic diagram of a system for updating a telephone number according to prior art. The system for updating a telephone number according to prior art includes a telephone set (110), a telephone switch (112) and a telco recording (114).

A caller dials a telephone number from a telephone set (110), either manually or with the help of a computer-based address book which may also automatically dial the number. Once placed, the call is routed to a telephone switch (112), which determines how to route the call to its destination. If the call can not be completed, for example because the number has been changed, the switch instead routes the call to a telephone company recording, e.g., a telco recording (114), that informs the caller that the number has been disconnected and/or changed. The caller placing the call hears the information and makes the appropriate editions to his/her address book.

It would be advantageous to provide an electronic information updating system that can automatically update address information with some degree of user-interaction and manage address books using the information embedded in bounced email messages.

SUMMARY OF THE INVENTION

The invention provides a process for updating address information in a computer environment.

One embodiment of the invention automatically inspects a message that is to be delivered to a first address to determine whether the message contains information about a status of a second address upon receiving the message. In response to a determination that the message contains information about the status of the second address, a record for the second address is updated in a database. In one example, the record is a portion of an address book of the first user in the database. In one example, the message is stored at the first address for retrieval by a first user at the first address; the status indicates a permanent error in delivering a message to the second address; and the address book is updated according to a user preference. The invention further allows various actions to be taken to update the address book. These actions may include transparently removing the second address from the address book; replacing the second address in the address book with a comment which indicates that it is undeliverable to the second address; and marking the second address and prompting the first user to take one or more actions with the second address. One example includes counting a number of messages that indicate the status of the second address; determining whether or not the number of messages is above a threshold; and determining an indicator indicating a likelihood of the second address being invalid. The second address may be an address for electronic mails, an address for a web page or a phone number for voice and text messages. In one example, the record is a portion of an address book of a second user in the database. When the second address is associated with a person who has a plurality of addresses, priorities of the plurality of addresses for the person are adjusted.

DETAILED DESCRIPTION OF THE INVENTION

The invention is embodied in an address management system in a computer environment. The invention provides a method and apparatus updating address information for delivery of electronic messages using information embedded in the inbound messages to be delivered to a user's account, web browser or mobile devices.

The term "address" as used herein means address information including, for example, an address for electronic mails, an address for a web page, a phone number for voice and text messages, and other electronic data.

One embodiment of the invention automates the updates of address information with some degree of user interaction. One embodiment of the invention allows actions to be taken for one or more users of an ISP to update the address information for one or more address books, based on the information embedded in the inbound messages received by one user. The invention also provides an efficient method of spam management.

Figure 2:
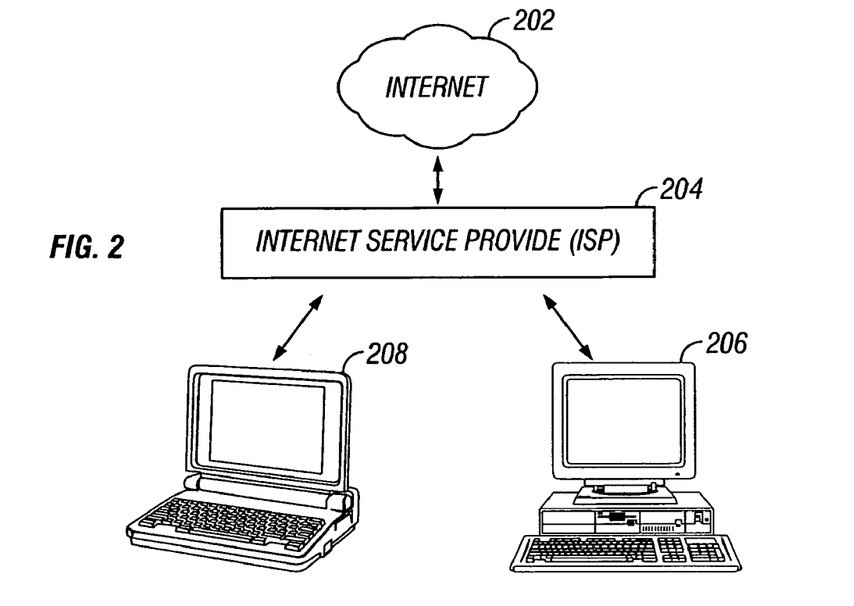
FIG. 2 is a block schematic diagram of a computer system according to the invention.

FIG. 2 is a block schematic diagram of a computer system for use in connection with the invention. Referring to FIG. 2, the invention provides a host-based address book system provided by one or more server computers of an ISP (204).

An ISP, such as AOL, provides centralized address book services as host-based address books for different users.

A user may employ one client computer (206) to access the host-based address book, or another client computer (208) to access the same address book. The user does not have to move or copy the address book from one client computer to another computer e.g. 206, 208. The address book may contain electronic information including but not limited to names, email addresses, telephone numbers and facsimile numbers.

In one embodiment of the invention, the client computer may be a desktop computer, laptop computer, mobile device, and other handheld devices, such as PDAs or Palm computers.

In one embodiment of the invention, the one or more server computers of an ISP (204) update the address information for one or more users, who access the system remotely from one or more client computers, based on bounced messages from a computer network such as Internet (202).

Figure 3:
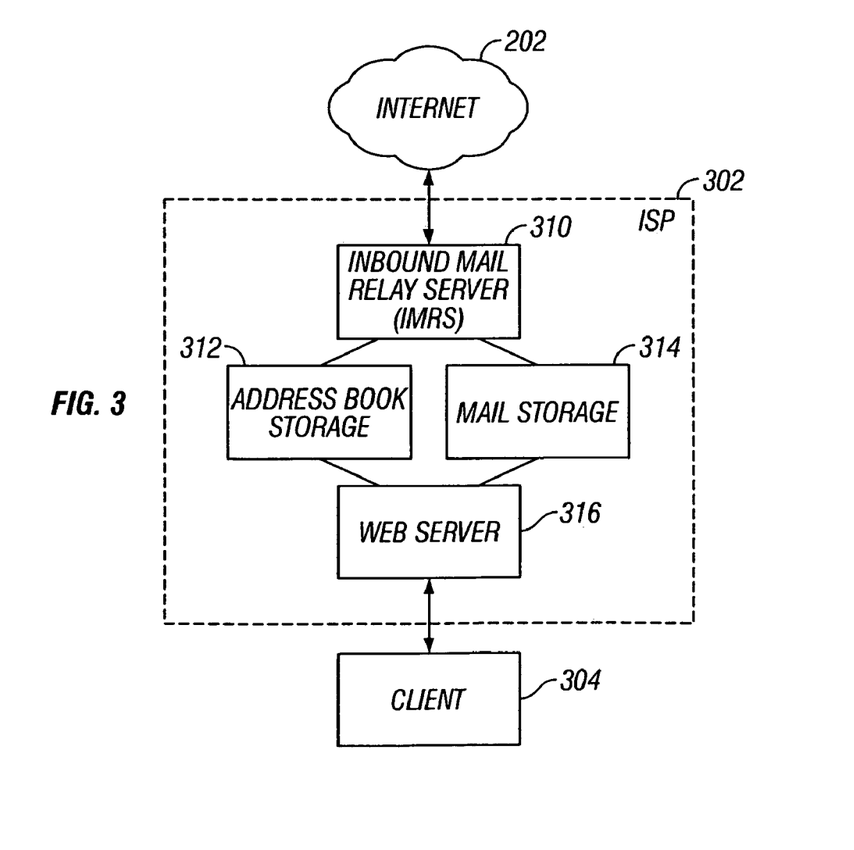
FIG. 3 is a detailed block schematic diagram of an address management system according to the invention.

FIG. 3 is a block schematic diagram of an address management system according to the invention. Referring to FIG. 3, the invention provides a number of server computers of an ISP (302) that includes an Inbound Mail Relay Server (IMRS 310), an address-book storage (312), a mail storage (314) and a web server (316). The server or servers of an ISP (302) send and receive email messages, including error messages sent by recipient server computers. Email messages can be viewed from client computers (304) after being further processed by the server or servers of an ISP (302).

The address book storage (312) stores one or more host-based address books for one or more users of the same ISP. The mail storage (314) stores email messages of various user accounts. The IMRS (310) routes the inbound mail messages from the Internet (202) to corresponding accounts in the mail storage (314) for storage and for later retrieval by the users of the accounts according to the destination address of the inbound mail messages. A user accesses a host-based address book in the address book storage (312) from a client computer (304) through a web server (316). For example, a user interface may be provided by a web server (316) to manipulate the address book stored on the address book storage (312) once the user logs on to the system.

In one embodiment of the invention, the IMRS (310) further inspects the inbound email messages for information indicative of the status of mail addresses for possible updates to the addresses. For example, a bounced email message, e.g. an error message, may contain the information specifying the nature of the error in delivering to an email address. Specifically, an error message may indicate that the recipient's mailbox is not available permanently, or that access to the mailbox name is not allowed temporarily. Some servers may even provide information about the changing of a domain. In this case, one embodiment of the invention updates all addresses at an old domain to corresponding addresses in a new domain according to user preferences.

In one embodiment, the inbound messages are screened for dead addresses that have permanent errors in delivering messages to these addresses. Upon the detection of a dead address, a record of a database on the address book storage (312) is updated for the management of the dead address.

Figure 4:
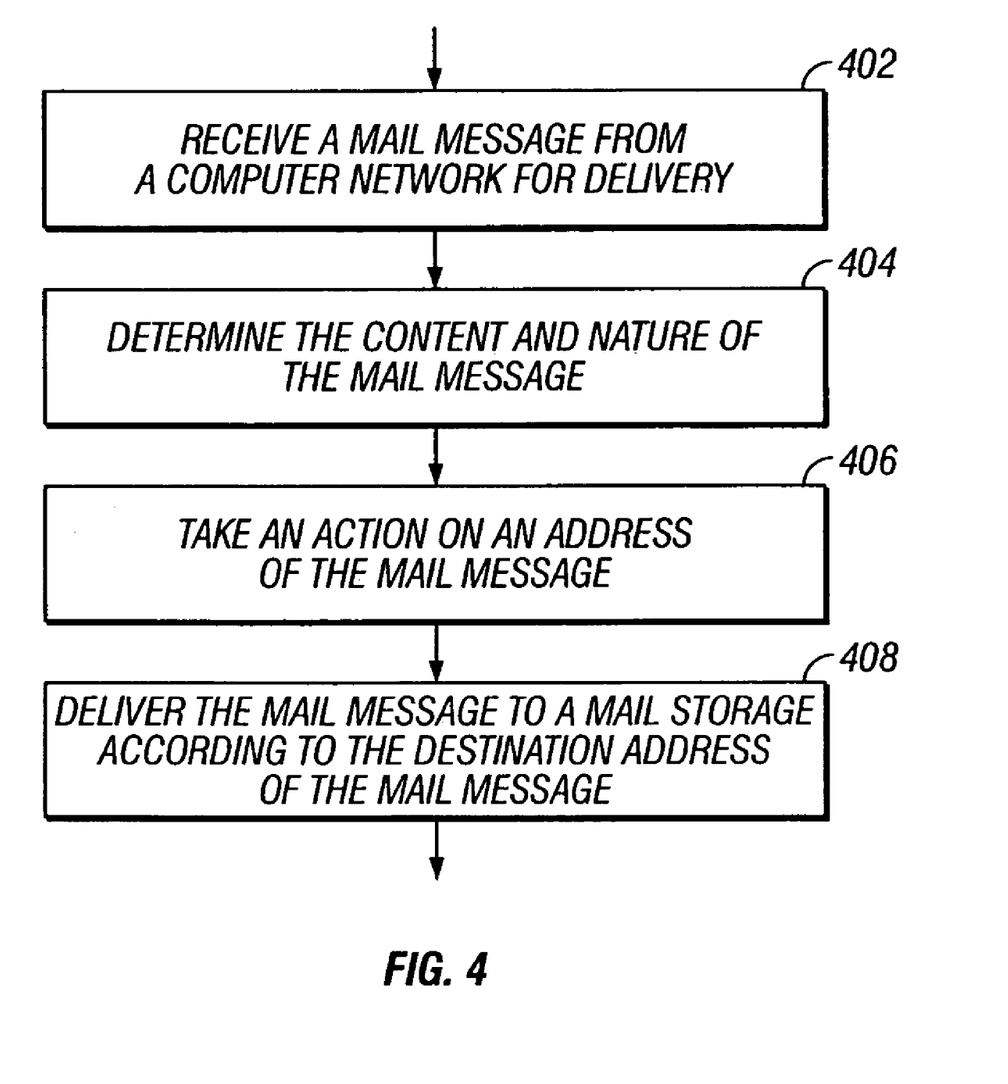
FIG. 4 is a block schematic diagram showing the updating of address information according to the invention.

FIG. 4 is a block schematic diagram showing the updating of address information according to the invention. Referring to FIG. 4, after a mail message is received from a computer network for delivery (402), its content is determined (404). More specifically, it is determined whether the email message is a regular email message or a bounced message. A regular email is passed on for further delivery. A bounced email that contains an error message indicating delivery failure is further inspected and the nature of the error is determined. If the delivery failure is temporary in nature, such as when the destination mailbox is full, or when the destination computer is not reachable, the original message may be scheduled for redelivery after a period of time. A number of automatic redeliveries may be tried before the delivery is aborted permanently.

A variety of actions can be taken for the address of the mail message (406) for an update in one or more address books before or after the mail message is delivered to the mail storage (314) in FIG. 3 according to the destination address of the mail message (408). The delivery failure is permanent in nature when the mailbox for a recipient's address is not available, when the domain of the address is changed, or when one or more address books need updates. More details about the actions that can be taken to manage the address book in response to the detection of a mail message of a specific nature are described below in conjunction with FIG. 7.

Figure 5:
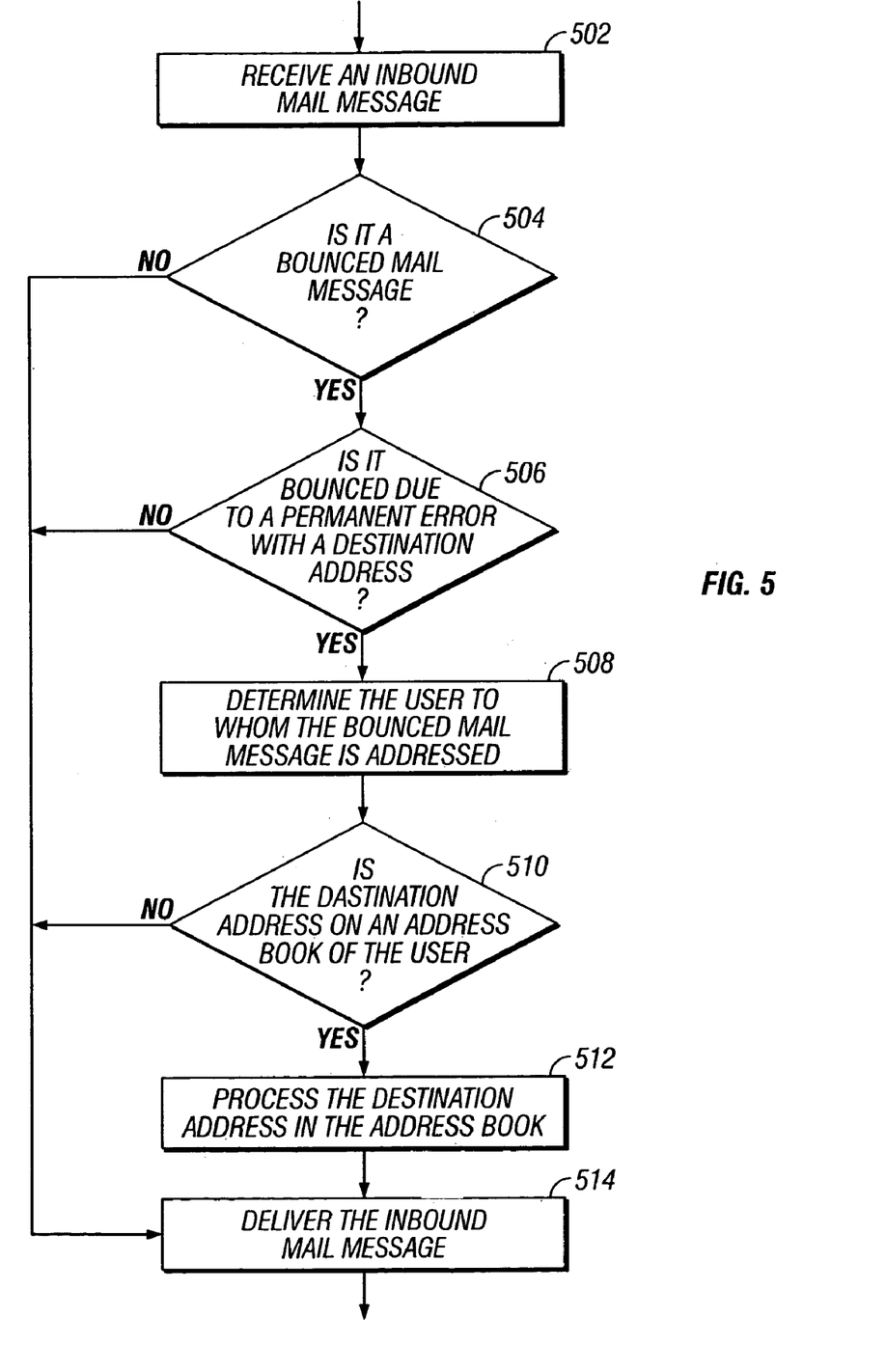
FIG. 5 is a block schematic diagram showing the inspecting of an inbound mail message for address status information according to the invention.

FIG. 5 is a block schematic diagram showing the inspecting of an inbound mail message for address status information according to the invention. Referring to FIG. 5, in one embodiment, after receiving an inbound mail message (502) it is determined whether the inbound mail message is a bounced mail message (504). If it is a bounced mail message, it is further determined whether the mail message is bounced due to a permanent error with a destination address (506). If the mail message is a bounced due to a permanent error, it is determined the user to whom the bounced mail message is addressed (508). If the destination address is on an address book of the user (510), the destination address in the address book is processed (512) for updates. Various actions of updating the address book of the user are described below in conjunction with FIG. 7.

After the inbound mail message is inspected for address status information, the inbound mail message is delivered (514). For example, the inbound mail message can be delivered for storage and for later retrieval by the user. Alternatively, the inbound mail message may be delivered for storing in the account for the user before the inbound mail message is inspected for address status information or before the processing of the address book.

Figure 6:
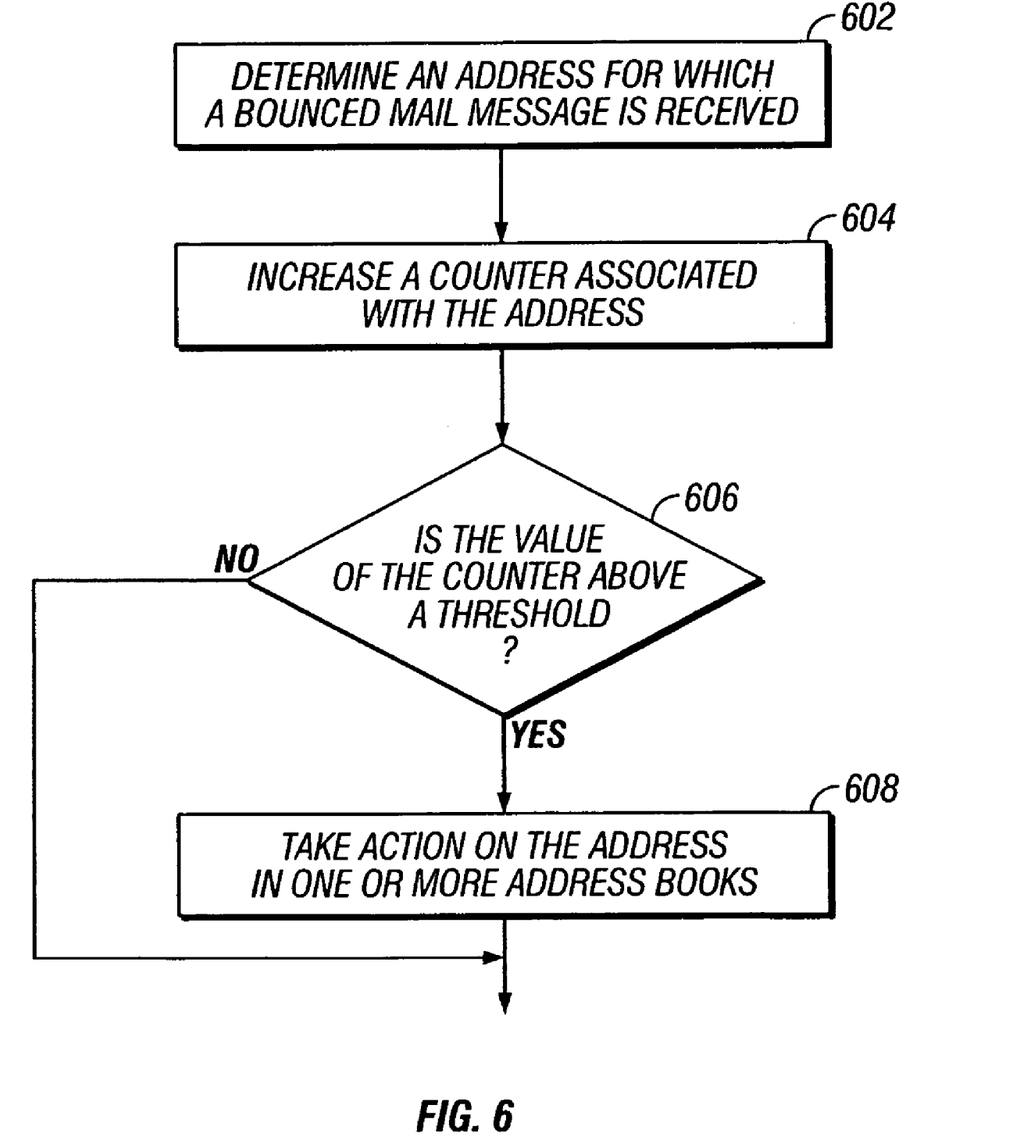
FIG. 6 is a block schematic diagram showing the counting of bounced mail messages in connection with the updating of address information according to the invention.

FIG. 6 is a block schematic diagram showing the counting of bounced mail messages in connection with the updating of address information according to the invention. Referring to FIG. 6, in one embodiment, a counter is associated with an address. After determining an address for which a bounced mail message is received (602), the counter associated with the address records an increased value (604). A threshold number can be pre-determined by the ISP or by the user. If it is determined that the value of the counter is above the threshold (606), an action or actions can be taken on the address in one or more address books (608). Various details of actions that can be taken are described below in connection with FIG. 7.

In one embodiment, only the address book of the individual user to whom the bounced mail message is addressed is managed for updates. Actions may be taken to manage the specific address book of the single user who receives the error message.

In another embodiment, the address books of a number of users who have the detected dead address listed on the address books are managed for updates. A host server or servers store address books of a number of users of the ISP. The address books of these users who have the detected dead address listed on the address books are selectively managed for updates according to a set of preferences. For example, a user may indicate to the system through a user preference whether the dead address information may be propagated to other users in the system or a list of users on the system. Furthermore, a user may also indicate through a user preference whether the user wants the notification of dead address information from messages for other users in the system or a list of users on the. system.

Further in one embodiment, the system tracks the addresses listed in the address books of one user, a group of users, or all users to determine the likelihood of an address of being invalid. When a user intends to send a message to a recipient's address, the system can provide the information of the likelihood of the intended recipient's address of being invalid to the user to consider using an alternative address in the address book.

Figure 7:
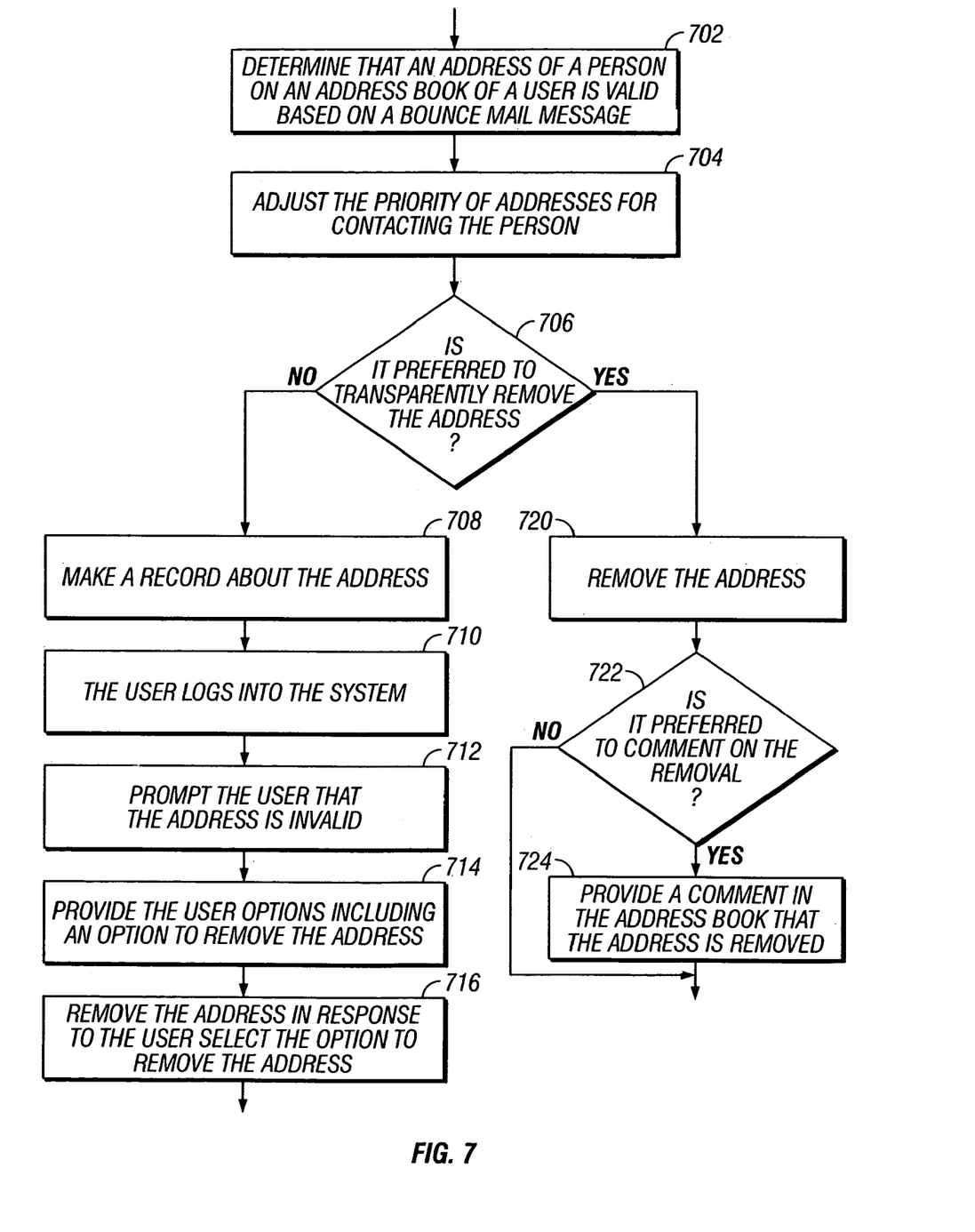
FIG. 7 is a detailed block schematic diagram showing the updating of address information according to the invention.

FIG. 7 is a block schematic diagram showing the updating of address information according to the invention. Referring to FIG. 7, the embodiments of the invention provide various actions that can be taken to update the address information of one or more users upon detection of an invalid address.

In one embodiment, upon determining that an address of a recipient on an address book of a user is invalid based on a bounced mail message (702), an address management system adjusts the priority of addresses for contacting the recipient (704). The user can establish a priority of different addresses according to the user's preferences. For example, for a business associate "Jane Smith," her work email address may be the high priority contact address, while her home email address, if available, can be a back-up address with a lower priority in case the work address fails. The address book of the user may contain the priority information according to the preference set by the user. Alternatively, the user may not set any priorities for the multiple addresses.

When an email message sent to Jane Smith's work email address is bounced with an error message, the user is prompted with a priority change message, such as "The work address of Jane Smith is not available for delivery, would you like to send the email to the home address that is second on the priority list?" If the user answers "yes," the address book automatically transmits the original email message to Jane Smith's home email address. If the user answers "no," the user can be prompted to take other possible actions. For example, the user can choose to abort the email attempt or to resend the email for another number of times before aborting the delivery for good. These options of taking different actions can also be established as a default by the user so that the ISP servers can perform these tasks automatically according to the user's instructions whenever similar situations occur. Alternatively, the system may prioritize the addresses without user intervention or user-specified priorities.

In one embodiment, if the user's computer is equipped to dial a telephone number or to send a facsimile message automatically, the user can also instruct the computer to do so in an effort to get an updated address information from the intended recipient of the email message. For example, the computer can be instructed to send the message through using the text message to a mobile device or as a fax. Similarly, an intended recipient of an email message may have more than two email addresses that have different priorities. Every email address of the same intended recipient included in the address book can be attempted until a successful delivery of the message in a similar fashion in an order of priority set by the user or determined by the system.

The user can also establish preferences for possible actions that can be taken to update the address information. According to the preference of the user, if it is not preferred to transparently remove the address (706), a record is made about the address (708). For example, records can be made indicating that the address information needs update when the user opens the address book or when the user uses the address.

After the user logs into the system (710), the address management system, prompts the user that the address is invalid (712) according to the record made about the address and provides the user with various options, including an option to remove the address (714). The address management system removes the address in response to the user's selected option to remove the address (716). If it is preferred to remove the address transparently (706), the address management system removes the address (720) from the address book. If, according to a user preference, it is preferred to comment on the removal (722), the address management system provides a comment in the address book that the address is removed (722).

Alternatively, the address management system may comment that: 1) the address is invalid or disabled; 2) the address now has a lower priority among the lists of the addresses; 3) the likelihood of the address being invalid is determined based on a pre-set indicator or indicators; 4) the number of times email message to the intended recipient's address have been bounced; or 5) two or more above scenarios.

Figure 8:
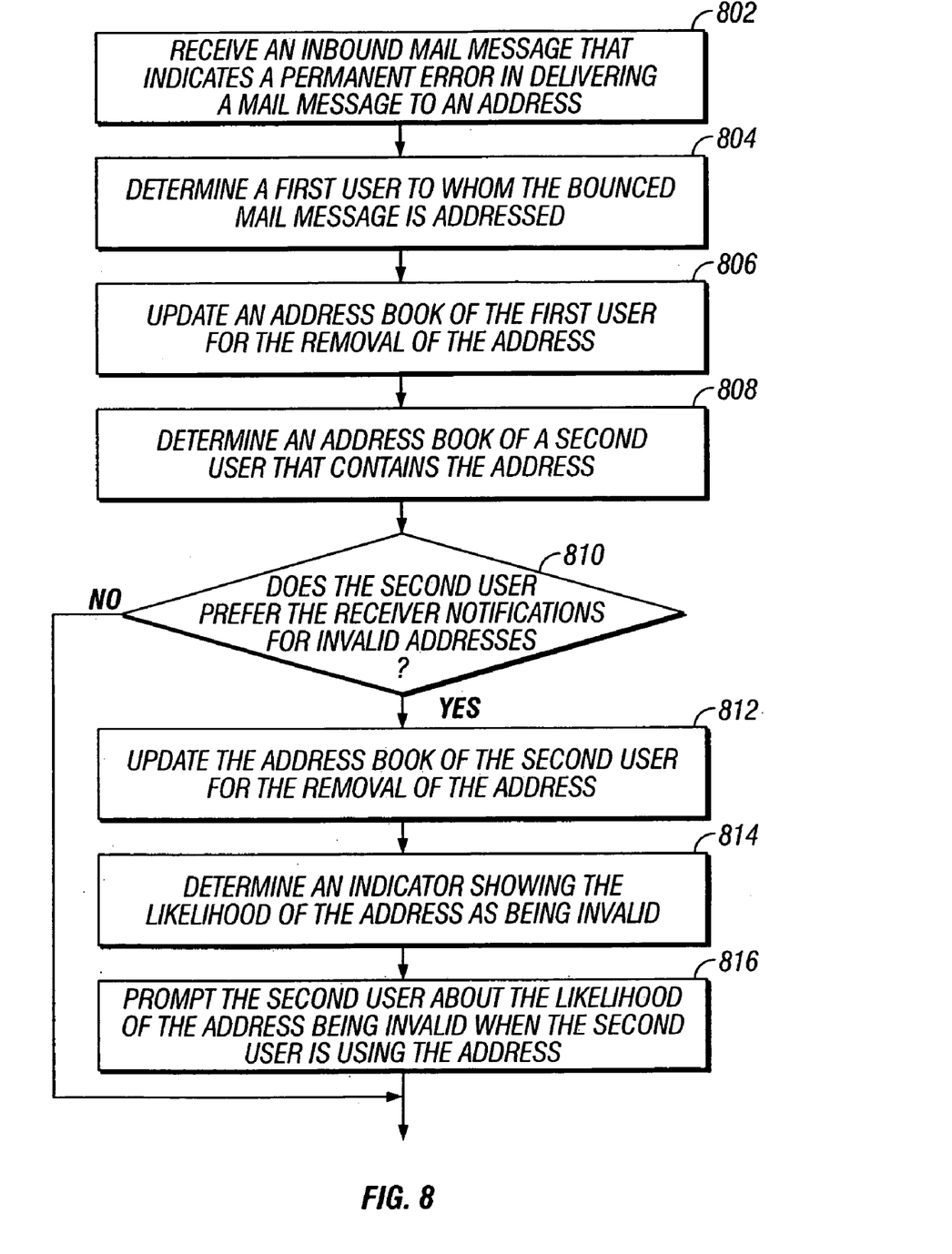
FIG. 8 is a block diagram showing the updating of address books for two or more users according to the invention.

FIG. 8 is a block schematic diagram showing the updating of address books for two or more users according to the invention. Referring to FIG. 8, the invention provides an efficient method of updating address books for one or more users in response to one error message bounced to one user. In reality, it is likely that many users of an ISP have one or more common addresses listed in their address books. For example, these users may share the address information through publishing one or more address cards.

In one embodiment, after receiving an inbound mail message that indicates a permanent error in delivering a mail message to an intended recipient's address (802), an address management module determines a first user to whom the bounced mail message is addressed (804). As a result, an address book of the first user is updated for automatic or manual removal of the intended recipient's address (806). For example, the address management module can transparently remove the address or mark the address for removal upon a confirmation from the user or disable the use of the address.

Further, the address management module determines if an address book of a second user contains the same intended recipient's address (808). The inbound mail message may not be directed to the second user but both the address books of the first and second user are under the control of the same address management module. For example, in a host-based address-book system shared by all users who subscribe to the same ISP the address management module can determine if the second user has the same address information of the intended recipient of the first user's email message.

For example, the determination can be made by performing a search in the address book database on the server or servers according to pre-set criteria. If it is determined that the address book of a second user also contains the address information of the same intended recipient, actions can be taken to update the address information in the address book of the second user.

If the second user prefers to receive notifications for invalid addresses (810), the address management module notifies the second users of the address change and updates the address book of the second user for the removal of the address (812). In one embodiment, the address management module further determines an indicator showing the likelihood of the address as being invalid (814) and prompts the second user with the same information when the second user is applying the address (816).

Similarly, more than two users of the same ISP can include the same address information of one or more contact persons. The same method can be used to update the address information of two or more users who include the same address information that is determined to be a dead address.

Although the above embodiments and examples are described in a particular combination and flow order, different combinations and different orders of processing steps can be used. For example, a threshold for the number of bounced messages for an address can be used by the system to determine whether or not to act on address books of other users in the system. Some user preferences can be shared or derived from other products and preferences, such as the setting and preferences of an address card publish and subscribe system that can be used for the propagation of actions for address book update from one user to other users.

An address card in the address book of one user may be sent to a number of users for subscription. Thus, these address books with the same address card can be treated as a group. If the address on the shared address card is found to be a dead address, the group of address books can be updated.

One embodiment of the invention can be implemented together with the address card publish and subscribe system to update address information of two or more users in an efficient manner. For example, a user preference for public address book management can be set for all subscribers of the address card. Specifically, the subscriber to the address card can choose to accept the address book management actions initiated by the bounced messages of other subscribers of the publisher of the subscriber.

When a first subscriber of the address card receives an email error message, the address book server determines whether a second subscriber to the address card allows the updates of the same address information based on the bounced message of other subscribers. If the answer is "yes," the second subscriber may be prompted with a message that the address information of the contact person is changed and actions may be taken to update the address information. The address information in other subscribers' address books can then be updated with one or more the actions as described in FIG. 7.

Although many examples are illustrated with address management modules for a host-based address book system, some of the methods can also be used with a module associated with a client program that receives messages for a user specified address. For example, a mail client may use a threshold to determine whether or not to remove an address that has bounced messages, to determine an indicator of a likelihood of an address being invalid, to adjust the priorities of a plurality of address for a person when an address for the person is determined to be invalid, and to perform other operations in combination thereof.

Figure 9:
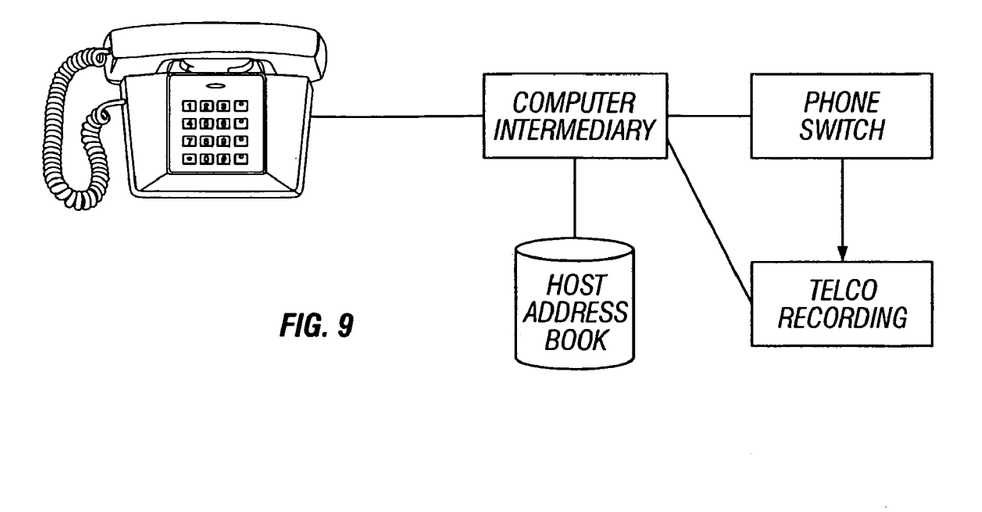
FIG. 9 is a block schematic diagram showing a system for the updating of a telephone number according to the invention.

FIG. 9 is a block schematic diagram showing a system for the updating of a telephone number according to the invention. The invention includes a telephone set 902, a computer intermediary (904), a host address-book (906), a telephone switch (908) and a telco recording (910).

A caller places a call from a telephone set (902). A computer intermediary (904) is in the voice path, listening to the outbound call placed by the caller. Once the call is connected, the computer intermediary (904) detects whether the call has reached its intended called party or whether it has been diverted to a recording.

The computer intermediary (904) may differentiate a telco recording from a human being's voice recording on an answering machine in a number of ways. For example, most telco recordings are preceded by telltale audio tones which can be easily recognized. Furthermore, the signaling of either in-band or out-of-band at the telephony network level may indicate that the call has be rerouted to a recording. Lastly, the computer can "listen" to the first few seconds of the conversation to determine whether the audio patterns match that of a telco recording.

If it is determined that the call has been diverted to a telco recording, the computer intermediary (904) determines the updated information. After determining that the call has been connected to a telco recording, the computer intermediary (904) can perform speech recognition or similar audio pattern matching techniques to determine whether the telco recording (910) message is for a disconnected number or for a change in telephone number. In the case of a disconnected number, the computer intermediary (904) can perform steps similar to those specified for permanent delivery failures applicable for the electronic text messages. For telephone number changes, the computer intermediary (904) can update the telephone number in the host-based address book (906) in a manner similar to those specified for email addresses earlier.

In this way, a host-based address book (906) can be updated if a telephone number has been changed. Specifically, when a caller phones a telephone number that has been changed and gets a recording that "The number you have dialed XXX-XXX-XXXX has been changed. The new number is YYY-YYY-YYYY" message", a host-based address book can be automatically updated.

Figure 10:
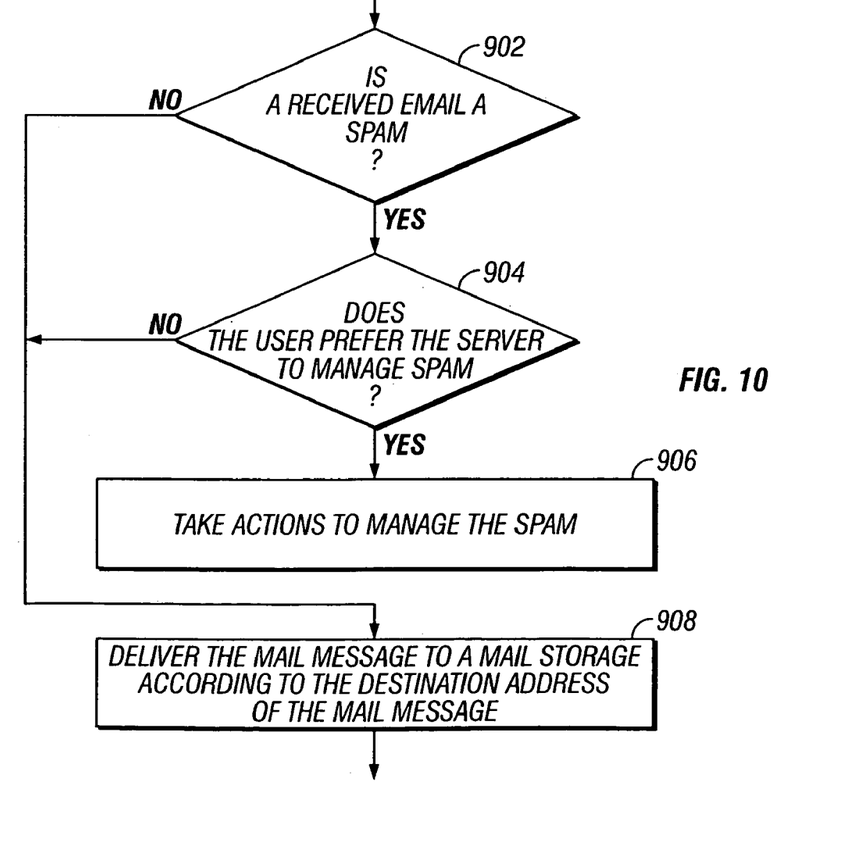
FIG. 10 is a block schematic diagram showing a method of spam management according to the invention.

FIG. 10 is a block schematic diagram of spam management in an integrated network system according to the invention. Referring to FIG. 10, one embodiment of the invention provides a method of spam management by one or more servers of an ISP.

In one embodiment, an email message received by one or more servers of an ISP, such as an IMRS (310) in FIG. 3 is determined to be a spam email or a regular email message (1002) according to predetermined criteria. Such techniques for making a determination and the types of criteria applied to do so are known to those skilled in the art and, therefore, are not discussed herein. If the email message is determined to be a regular email, it is delivered to a mail storage, such as mail storage (314) in FIG. 3 according to the destination address of the email message (1008).

If the email message is determined to be a spam, it is further determined whether a user prefers to manage spam or to allow the system to manage spam at the user's discretion (1004). If it is determined that the user prefers to manage spam, the spam email is delivered to a mail storage (314) according to the destination address of the spam email message (1008). However, if it is determined that the user prefers to let the system manage spam, actions can be taken to manage the spam email by one or more servers (1006), such as address book storage (312) in FIG. 3.

In one embodiment, according to the preference of the user, a record is made about the address of the spam. For example, records can be made to indicate that the user prefer to record the spam address for the purpose of refusing future spam emails from the same address. Further, the system may determine the likelihood of an address being a spam address according to pre-set criteria.

Based on the record of the spam address, for example, the server or servers can automatically delete the email message with the spam address or deliver the spam email to a special location, such as a bulk mail folder, for further inspection.

Further in one embodiment, when an address is marked as spam the server or servers automatically generate a reply email that can be sent to the spam address. The reply email requests that the spam sender permanently delete the user's email address from the spam mailing list and discontinue spam in the future. In this way, one embodiment of the invention provides a mechanism of spam prevention that shoulders the burden of discontinuing future spam on the spam sender. Should the spam originator be legally required to discontinue sending spam to the same user, this mechanism makes such anti-spam laws technically possible.

It is important to note that embodiments of the methods can be further used with messages other than electronic mail messages. The aforementioned electronic content can also include voice messages and web addresses. For example, the embodiments of the invention can be used to update web addresses. When a web site is moved from one location to another, the web site may provide information indicating the move and pointing to the new location. Upon detecting such information, a proxy server may use an address management module to update host-based bookmarks, e.g. a list of web address for favorite web sites, of one or more users. Furthermore, the addresses may include other types of addresses for the delivery of electronic contents across communication networks, such as phone numbers for the delivery of text message, and/or other types of messages, such as voice and picture messages to mobile and fixed-line devices.

It is also important to note that embodiments of the invention include an apparatus for updating address information according to the methods described above and a program storage medium readable by a computer, tangibly embodying a program of instructions executable by the computer to perform the method for updating address information as described above.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A process for updating electronic information in a computer environment, comprising the steps of:
   automatically inspecting a message that is to be delivered to a first address upon receiving the message to determine whether the message contains information about a status of a second address,
   in response to a determination that the message contains information about the status of the second address, updating a record for the second address in a database, and
   storing the message at the first address for retrieval by a first user at the first address,
   wherein the record is a portion of an address book of a second user in the database.

2. The process of claim 1, wherein the record is a portion of an address book of the first user in the database.

3. The process of claim 2, wherein the status indicates a permanent error in delivering a message to the second address; and said updating is according to a user preference.

4. The process of claim 3, wherein said updating further comprises the steps of:
    transparently removing the second address from the address book.

5. The process of claim 3, wherein said updating further comprises the steps of:
    replacing the second address in the address book with a comment which indicates that it is undeliverable to the second address.

6. The process of claim 3, wherein said updating further comprises the steps of:
    marking the second address; and
    prompting the first user to take one or more actions with the second address.

7. The process of claim 1, wherein said updating further comprises the steps of:
    counting a number of messages that indicate the status of the second address; and
    determining whether or not the number of messages is above a threshold.

8. The process of claim 7, wherein said updating further comprises the step of:
    determining an indicator indicating a likelihood of the second address being invalid.

9. The process of claim 1, wherein the second address comprises one of:
    an address for electronic mails; an address for a web page; and a phone number.

10. The process of claim 1, wherein the second address is associated with a person who has a plurality of addresses; and said updating comprises the step of:
    adjusting priorities of the plurality of addresses for the person.

11. An apparatus for updating address information in a computer environment, comprising:
    a module for receiving a message that is to be delivered to a first address;
    a module for automatically inspecting the message to determine whether the message contains Information about a status of a second address;
    a module for updating a record for the address in a database, in response to a determination that the message contains information about the status of the second address; and
    a module for storing the message at the first address for retrieval by a first user at the first address,
    wherein the record is a portion of an address book of a second user in the database.

12. The apparatus of claim 11, wherein the record is a portion of an address book of the first user in the database.

13. The apparatus of claim 12, wherein the status indicates a permanent error in delivering a message to the second address; and the record is updated according to a user preference.

14. The apparatus of claim 13, wherein said module for updating further comprises:
    a module for transparently removing the second address from the address book.

15. The apparatus of claim 13, wherein said module for updating further comprises:
    a module for replacing the second address in the address book with a comment which indicates that it is undeliverable to the second address.

16. The apparatus of claim 13, wherein said module for updating further comprises:
    a module for marking the second address; and
    a module for prompting the first user to take one or more actions with the second address.

17. The apparatus of claim 11, wherein said module for updating further comprises:
    a module for counting a number of messages that indicate the status of the second address; and
    a module for determining whether or not the number of messages is above a threshold.

18. The apparatus of claim 17, wherein said module for updating further comprises:
    a module for determining an indicator indicating a likelihood of the second address being invalid.

19. The apparatus of claim 11, wherein the second address comprises one of:
    an address for electronic mails; an address for a web page; and a phone number.

20. The apparatus of claim 11, wherein the second address is associated with a person who has a plurality of addresses; and said module for updating comprises:
    a module for adjusting priorities of the plurality of addresses for the person.

21. A program storage medium readable by a computer, tangibly embodying a program of instructions executable by the computer to perform a method for updating address information in a computer environment, the method comprising the steps of:
    receiving a message that is to be delivered to a first address;
    automatically inspecting the message to determine whether the message contains information about a status of a second address;
    in response to a determination that the message contains information about the status of the second address, updating a record for the address in a database; and
    storing the message at the first address for retrieval by a first user at the first address,
    wherein the record is a portion of an address book of a second user in the database.

22. The medium of claim 21, wherein the record is a portion of an address book of the first user in the database.

23. The medium of claim 22, wherein the status indicates a permanent error in delivering a message to the second address; and, said updating is according to a user preference.

24. The medium of claim 23, wherein said updating further comprises the step of:
    transparently removing the second address from the address book.

25. The medium of claim 23, wherein said updating further comprises the steps of:
    replacing the second address in the address book with a comment which indicates that it is undeliverable to the second address.

26. The medium of claim 23, wherein said updating further comprises the steps of:
    marking the second address; and
    prompting the first user to take one or more actions with the second address.

27. The medium of claim 21, wherein said updating further comprises the steps of:
    counting a number of messages that indicate the status of the second address; and
    determining whether or not the number of messages is above a threshold.

28. The medium of claim 27, wherein said updating further comprises the step of:
    determining an indicator indicating a likelihood of the second address being invalid.

29. The medium of claim 21, wherein the second address comprises one of:
an address for electronic mails; an address for a web page; and a phone number.

30. The medium of claim 21, wherein the second address is associated with a person who has a plurality of addresses; and said updating comprises the step of:
adjusting priorities of the plurality of addresses for the person.

31. A process for updating electronic information in a computer environment, comprising the steps of:
automatically inspecting a message that is to be delivered to a first address upon receiving the message to determine whether the message contains information about a status of a second address;
in response to a determination that the message contains information about the status of the second address, updating a record for the second address in a database, where said updating includes
counting a number of messages that indicate the status of the second address;
determining whether or not the number of messages is above a threshold; and
determining an indicator indicating a likelihood of the second address being invalid.

32. The process of claim 31, further comprising the steps of:
storing the message at the first address for retrieval by a first user at the first address.

33. The process of claim 32, wherein the record is a portion of an address book of the first user in the database.

34. The process of claim 33, wherein the status indicates a permanent error in delivering a message to the second address; and said updating is according to a user preference.

35. The process of claim 34, wherein said updating further comprises the steps of:
transparently removing the second address from the address book.

36. The process of claim 34, wherein said updating further comprises the steps of:
replacing the second address in the address book with a comment which indicates that it is undeliverable to the second address.

37. The process of claim 34, wherein said updating further comprises the steps of:
marking the second address; and
prompting the first user to take one or more actions with the second address.

38. The process of claim 32, wherein the record is a portion of an address book of a second user in the database.

39. The process of claim 32, wherein the second address is associated with a person who has a plurality of addresses; and said updating comprises the step of:
adjusting priorities of the plurality of addresses for the person.

40. The process of claim 31, wherein the second address comprises one of:
an address for electronic mails; an address for a web page; and a phone number.

41. An apparatus for updating address information in a computer environment, comprising:
a module for receiving a message that is to be delivered to a first address;
a module for automatically inspecting the message to determine whether the message contains information about a status of a second address;
a module for updating a record for the address in a database, in response to a determination that the message contains information about the status of the second address, said module for updating further comprising:
a module for counting a number of messages that indicate the status of the second address,
a module for determining whether or not the number of messages is above a threshold, and
a module for determining an indicator indicating a likelihood of the second address being invalid.

42. The apparatus of claim 41, further comprising:
a module for storing the message at the first address for retrieval by a first user at the first address.

43. The apparatus of claim 42, wherein the record is a portion of an address book of the first user in the database.

44. The apparatus of claim 43, wherein the status indicates a permanent error in delivering a message to the second address; and the record is updated according to a user preference.

45. The apparatus of claim 44, wherein said module for updating further comprises:
a module for transparently removing the second address from the address book.

46. The apparatus of claim 44, wherein said module for updating further comprises:
a module for replacing the second address in the address book with a comment which indicates that it is undeliverable to the second address.

47. The apparatus of claim 44, wherein said module for updating further comprises:
a module for marking the second address; and
a module for prompting the first user to take one or more actions with the second address.

48. The apparatus of claim 42, wherein the record is a portion of an address book of a second user in the database.

49. The apparatus of claim 42, wherein the second address is associated with a person who has a plurality of addresses; and said module for updating comprises:
a module for adjusting priorities of the plurality of addresses for the person.

50. The apparatus of claim 41, wherein the second address comprises one of:
an address for electronic mails; an address for a web page; and a phone number.

51. A program storage medium readable by a computer, tangibly embodying a program of instructions executable by the computer to perform a method for updating address information in a computer environment, the method comprising the steps of:
receiving a message that is to be delivered to a first address;
automatically inspecting the message to determine whether the message contains information about a status of a second address; and
in response to a determination that the message contains information about the status of the second address, updating a record for the address in a database, wherein said updating further comprises the steps of:
counting a number of messages that indicate the status of the second address,
determining whether or not the number of messages is above a threshold, and
determining an indicator indicating a likelihood of the second address being invalid.

52. The medium of claim 51, wherein the method further comprises the step of:

storing the message at the first address for retrieval by a first user at the first address.

53. The medium of claim 52, wherein the record is a portion of an address book of the first user in the database.

54. The medium of claim 53, wherein the status indicates a permanent error in delivering a message to the second address; and, said updating is according to a user preference.

55. The medium of claim 54, wherein said updating further comprises the step of:
transparently removing the second address from the address book.

56. The medium of claim 54, wherein said updating further comprises the steps of:
replacing the second address in the address book with a comment which indicates that it is undeliverable to the second address.

57. The medium of claim 54, wherein said updating further comprises the steps of:
marking the second address; and
prompting the first user to take one or more actions with the second address.

58. The medium of claim 52, wherein the record is a portion of an address book of a second user in the database.

59. The medium of claim 52, wherein the second address is associated with a person who has a plurality of addresses; and said updating comprises the step of:
adjusting priorities of the plurality of addresses for the person.

60. The medium of claim 51, wherein the second address comprises one of:
an address for electronic mails; an address for a web page; and a phone number.

* * * * *